(12) United States Patent
Pan

(10) Patent No.: US 11,785,190 B2
(45) Date of Patent: Oct. 10, 2023

(54) PROJECTION APPARATUS AND CONTROL METHOD FOR PROJECTION APPARATUS

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/206,152

(22) Filed: Mar. 19, 2021

(65) Prior Publication Data

US 2021/0368145 A1 Nov. 25, 2021

(30) Foreign Application Priority Data

May 21, 2020 (CN) .......................... 202010434635.8

(51) Int. Cl.
*H04N 9/31* (2006.01)
*G03B 33/08* (2006.01)
*G03B 21/20* (2006.01)

(52) U.S. Cl.
CPC ......... *H04N 9/3161* (2013.01); *G03B 21/204* (2013.01); *G03B 21/2013* (2013.01); *G03B 33/08* (2013.01); *H04N 9/3111* (2013.01)

(58) Field of Classification Search
None
See application file for complete search history.

(56) References Cited

U.S. PATENT DOCUMENTS

| 2012/0026472 A1* | 2/2012 | Masuda | G03B 21/204 |
| | | | 315/312 |
| 2018/0129123 A1* | 5/2018 | Guo | H04N 9/3161 |
| 2021/0289177 A1* | 9/2021 | Xiao | H04N 9/3114 |

FOREIGN PATENT DOCUMENTS

| CN | 103676434 | 3/2014 |
| CN | 104765237 | 7/2015 |
| CN | 104765238 | 7/2015 |
| CN | 107065410 | 8/2017 |
| CN | 208283710 | 12/2018 |

(Continued)

OTHER PUBLICATIONS

"Office Action of China Counterpart Application", dated Oct. 27, 2022, pp. 1-7.

(Continued)

*Primary Examiner* — Bao-Luan Q Le
*Assistant Examiner* — Danell L Owens
(74) *Attorney, Agent, or Firm* — JCIPRNET

(57) ABSTRACT

A projection apparatus includes an illumination system including a first laser light source and a second laser light source, a first light valve, and a second light valve. The first laser light source provides a first laser beam in first time periods. The second laser light source provides a second laser beam in second time periods. A color refresh rate of the projection apparatus is the number of times of alternating the first and second time periods with each other, and the color refresh rate ranges between 60 Hz and 6000 Hz. The first and second laser beams respectively form a first color light and a second color light when exiting the illumination system. The first and second light valves are located on a transmission path of the first color light. One of the first and second light valves is located on a transmission path of the second color light.

21 Claims, 9 Drawing Sheets

(56) References Cited

FOREIGN PATENT DOCUMENTS

| | | | |
|---|---|---|---|
| CN | 208283710 U | * | 12/2018 |
| CN | 109116669 | | 1/2019 |
| CN | 110398877 | | 11/2019 |
| CN | 209590519 | | 11/2019 |
| JP | WO2016189582 | | 3/2018 |

OTHER PUBLICATIONS

"Office Action of China Counterpart Application", dated Apr. 18, 2022, p. 1-p. 10.

* cited by examiner

PROJECTION APPARATUS AND CONTROL METHOD FOR PROJECTION APPARATUS

CROSS-REFERENCE TO RELATED APPLICATION

This application claims the priority benefit of China application serial no. 202010434635.8, filed on May 21, 2020. The entirety of the above-mentioned patent application is hereby incorporated by reference herein and made a part of this specification.

BACKGROUND

Technical Field

The invention relates to a projection apparatus and a control method for a projection apparatus.

Description of Related Art

In recent years, projection apparatuses mainly adopting solid state light sources, such as light emitting diodes (LEDs) and laser diodes, etc., have been drawing attention in the market. In general, the excitation light of the solid state light sources is converted by a wavelength conversion material on the wavelength conversion module in the projection apparatus to generate converted light of different colors. In order to satisfy the demands for color performance, a filter module may be disposed on a light path at a later stage of the projection apparatus. The converted light on the wavelength conversion module may pass through the filter module and be filtered to form predetermined color lights according to a time sequence. These color lights are modulated by a light valve to form an image beam to be projected to the outside.

In general, since there is an interface between a wavelength conversion region and a non-conversion region on the wavelength conversion element of the wavelength conversion module, when the excitation light is incident to the vicinity of the interface region, a portion of the excitation light is located in the wavelength conversion region, while another portion of the excitation light is located in the non-conversion region. Such state is referred to as a spoke state, in which a discoloring phenomenon (i.e., the color of the image is not displayed correctly) may occur. Since the wavelength conversion element keeps rotating, the proportions of excitation light incident to the wavelength conversion region and to the non-conversion region may change through time. As a result, the light beam emitted out of the wavelength conversion element may form converted light and non-converted light with unstable intensities. As a result, when the wavelength conversion element is rotated to the spoke, the light valve operating in the projection apparatus is temporarily turned off to avoid the discoloring of an image. However, as a consequence, the brightness of the image displayed by the projection apparatus is reduced.

Meanwhile, to increase the color refresh rate of the projection apparatus, so as to suppress the color break issue in the visual perception of human eyes, thereby offering a smoother viewing experience, it is common in the conventional projection apparatus to increase the rotation speed of the wavelength conversion element as well as the numbers of the wavelength conversion regions and non-conversion regions of the wavelength conversion element. However, the frequency of going through the spoke region may increase as the numbers of the wavelength conversion regions and non-conversion regions increase. Therefore, to ensure a certain level of brightness of the displayed image, the color refresh rate as well as the numbers of the wavelength conversion regions and the non-conversion regions of the projection apparatus are limited to a certain extent.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projection apparatus capable of displaying an image in favorable quality.

The invention provides a control method for the projection apparatus. According to the method, the projection apparatus is able to display an image in favorable quality.

According to the invention, the discoloring phenomenon of an image when the projection apparatus is in the spoke may be eliminated, and the use efficiency of a light valve is increased. Accordingly, the brightness is increased. In addition, the color refresh rate of the projection apparatus is increased, and the color break issue is suppressed. The rotation of a wavelength conversion module does not need to be synchronized with a light source and the light valve. The projection apparatus is capable of providing blue color points meeting the standards of DCI-P3 and BT2020, so as to offer smoother viewing experience.

Other objects and advantages of the invention can be further illustrated by the technical features broadly embodied and described as follows.

To achieve one or some or all of the above or other objectives, an embodiment of the invention provides a projection apparatus. The projection apparatus includes an illumination system, a first light valve, and a second light valve. The illumination system is configured to provide an illumination beam, and the illumination system includes a first laser light source and a second laser light source. The first laser light source provides a first laser beam in a plurality of first time periods. The second laser light source provides a second laser beam in a plurality of second time periods. The first laser beam and the second laser beam have different main wavelengths, a color refresh rate of the projection apparatus is a number of times of alternating the first time periods and the second time periods with each other, and a range of the color refresh rate is between 60 Hz and 6000 Hz. The first laser beam and the second laser beam respectively form a first color light and a second color light when exiting the illumination system, the first light valve and the second light valve are located on a transmission path of the first color light, and one of the first light valve and the second light valve is located on a transmission path of the second color light.

To achieve one or some or all of the above or other objectives, an embodiment of the invention provides a control method for a projection apparatus suitable to control the projection apparatus. The control method includes the following: controlling the first laser light source to provide a first laser beam during a plurality of first time periods, wherein the first laser beam forms a first color light when exiting the illumination system, and the first light valve and the second light valve are located on a transmission path of the first color light; and controlling the second laser light source to provide a second laser beam during a plurality of second time periods, wherein the first laser beam and the second laser beam have different main wavelengths, the second laser beam forms a second color light when exiting the illumination system, one of the first light valve and the second light valve is located on a transmission path of the second color light, and a color refresh rate of the projection apparatus is a number of times of alternating the first time periods and the second time periods with each other, and a range of the color refresh rate is between 60 Hz and 6000 Hz.

Based on the above, the embodiments of the invention include at least one of the following advantages or effects. According to an embodiment of the invention, with the first laser light source and the second laser light source, the projection apparatus is able to form the color lights as desired in different time periods while avoiding the discoloring phenomenon of an image resulting from the spoke, thereby maintaining the brightness of the frame. In addition, with the projection apparatus and the control method for the projection apparatus according to the embodiments of the invention, the color refresh rate of the projection apparatus can be increased by simply and freely switching the ON and OFF states of the first laser light source and the second laser light source. Accordingly, the color break issue can be eliminated, and the viewing experience can be smoother.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
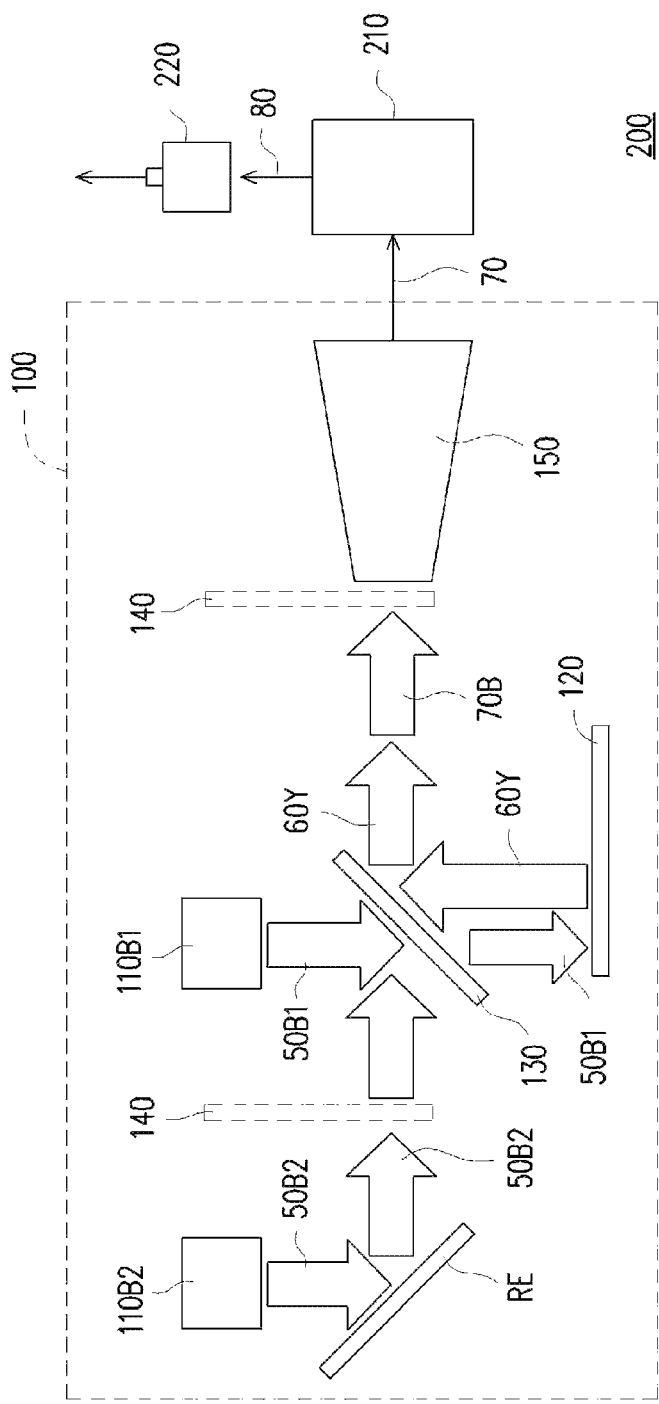
FIG. 1A is a schematic view illustrating a framework of a projection apparatus according to an embodiment of the invention.
Figure 1B:
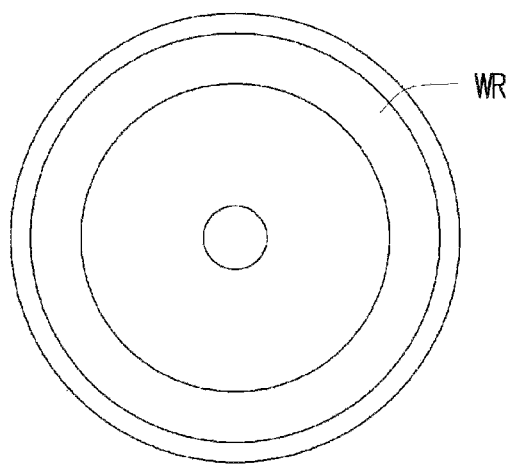
FIG. 1B is a schematic view illustrating a wavelength conversion module of FIG. 1A.
Figure 1C:
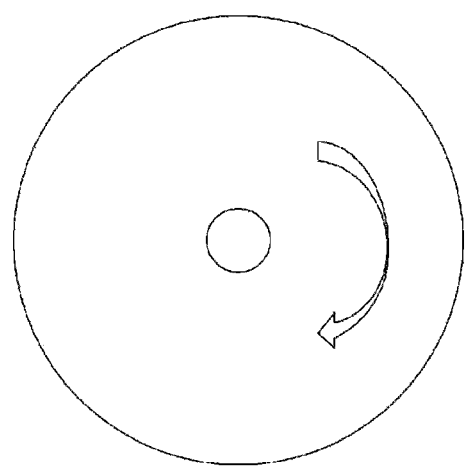
FIG. 1C is a schematic view illustrating a light diffusion element of FIG. 1A.
Figure 1D:
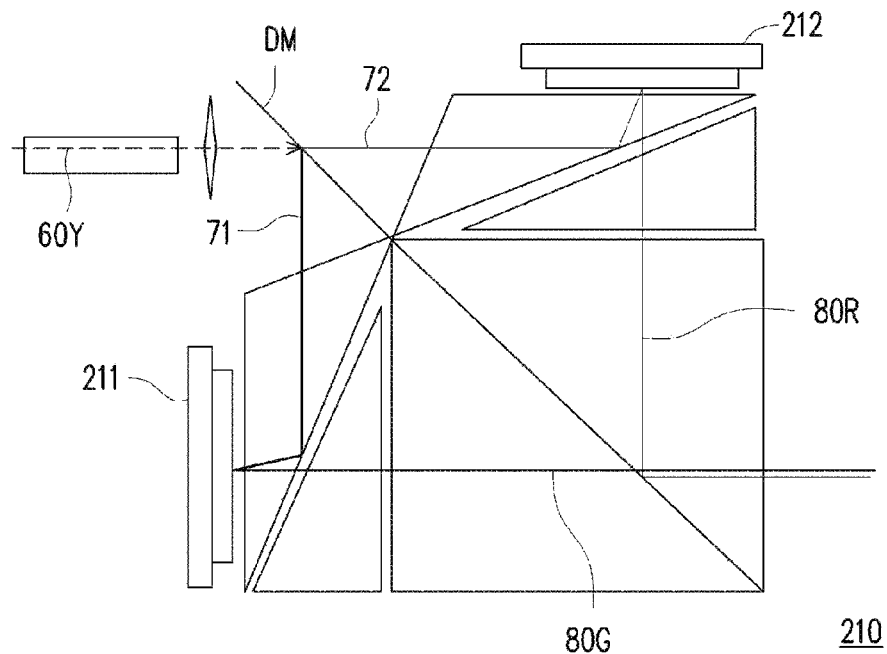
FIG. 1D is a schematic view illustrating a light path through which a first color light of FIG. 1A is incident to a first light valve and a second light valve.
Figure 1E:
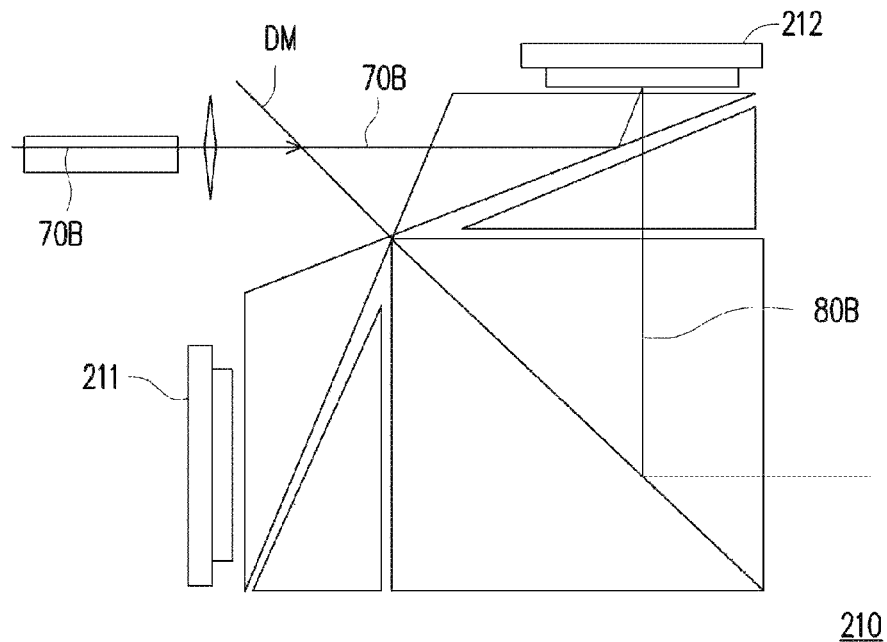
FIG. 1E is a schematic view illustrating a light path through which the second color light of FIG. 1A is incident to the second light valve.
Figure 1F:
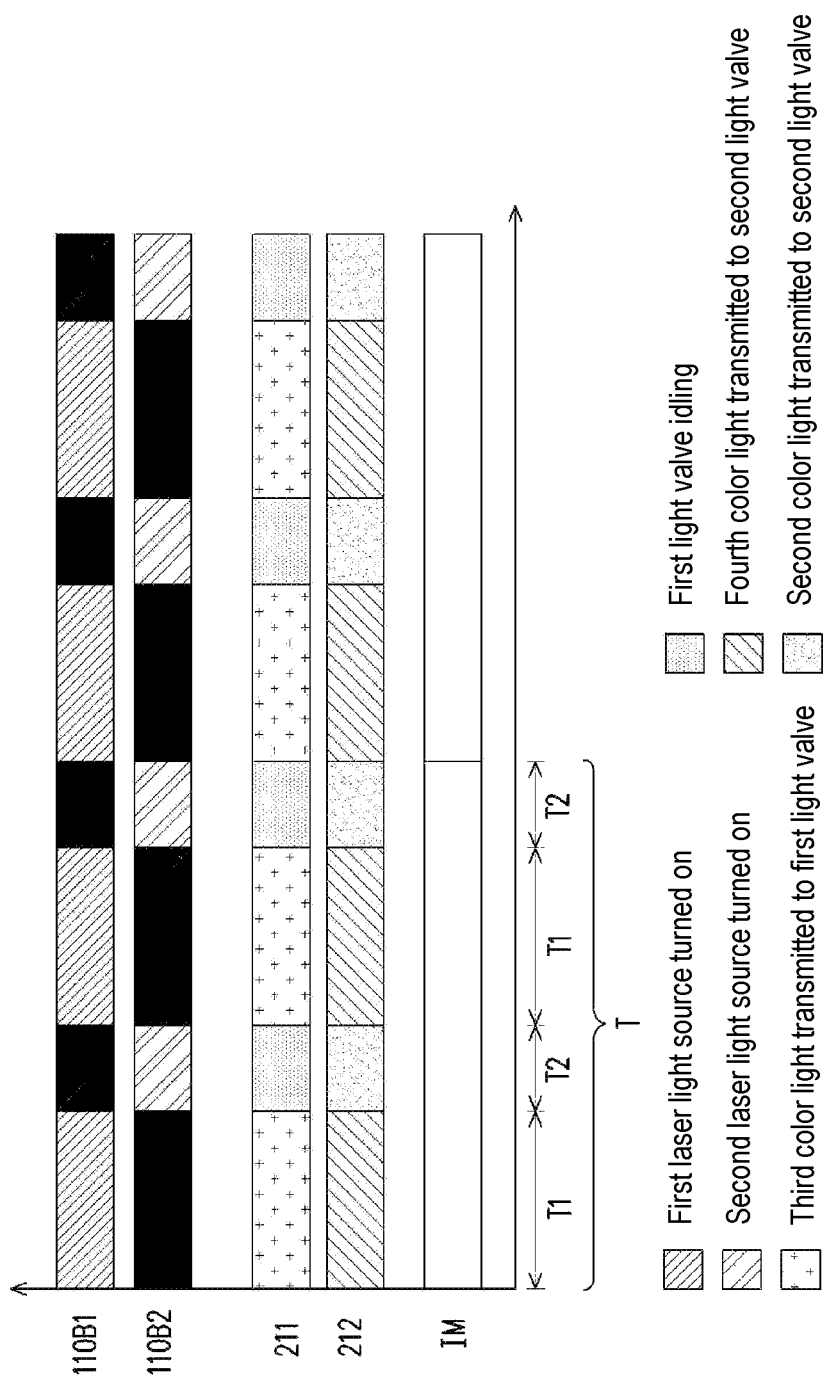
FIG. 1F is a schematic view illustrating a time sequence of a first laser light source, a second laser light source, the first light valve, and the second light valve of FIG. 1A in different time periods.
Figure 1G:
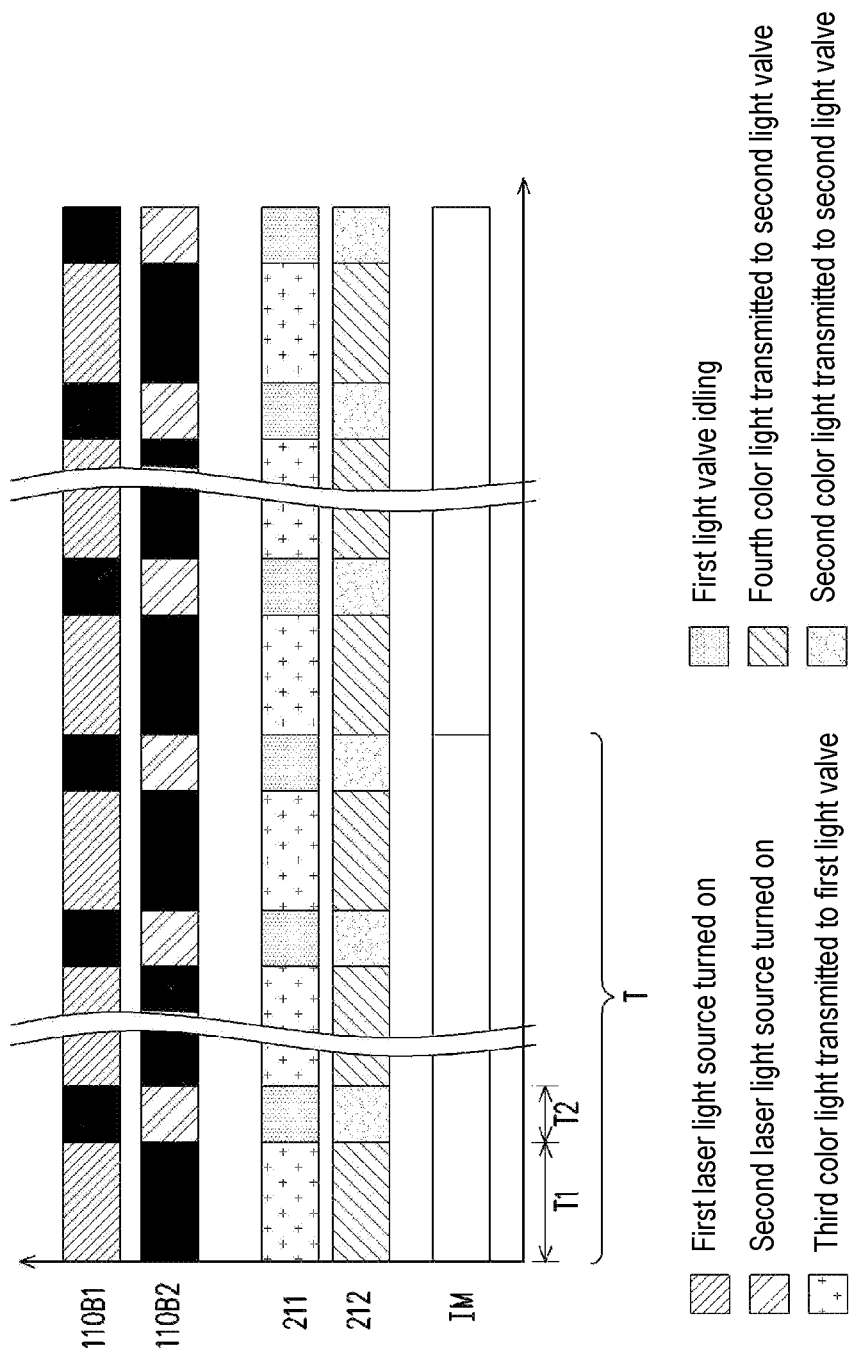
FIG. 1G is a schematic view illustrating another time sequence of a first laser light source, a second laser light source, the first light valve, and the second light valve of FIG. 1A in different time periods.

FIG. 1A is a schematic view illustrating a framework of a projection apparatus according to an embodiment of the invention. FIG. 1B is a schematic view illustrating a wavelength conversion module of FIG. 1A. FIG. 1C is a schematic view illustrating a light diffusion element of FIG. 1A. FIG. 1D is a schematic view illustrating a light path through which a first color light of FIG. 1A is incident to a first light valve and a second light valve. FIG. 1E is a schematic view illustrating a light path through which the second color light of FIG. 1A is incident to the second light valve. FIG. 1F is a schematic view illustrating a time sequence of a first laser light source, a second laser light source, the first light valve, and the second light valve of FIG. 1A in different time periods. FIG. 1G is a schematic view illustrating another time sequence of a first laser light source, a second laser light source, the first light valve, and the second light valve of FIG. 1A in different time periods. Referring to FIG. 1A to 1E, a projection apparatus 200 includes an illumination system 100, a light valve module 210, and a projection lens 220. The illumination system 100 is adapted to provide an illumination beam 70. The light valve module 210 is disposed on a transmission path of the illumination beam 70 and adapted to convert the illumination beam 70 into an image beam 80. The projection lens 220 is disposed on a transmission path of the image beam 80 and adapted to project the image beam 80 out of the projection apparatus 200. As shown in FIGS. 1D to 1E, in the embodiment, the light valve module 210 includes a first light valve 211 and a second light valve 212. For example, in the embodiment, the first light valve 211 and the second light valve 212 in the light valve module 210 may be a digital micro-mirror device (DMD) or a liquid-crystal-on-silicon (LCOS) panel. However, in other embodiments, the first light valve 211 and the second light valve 212 in the light valve module 210 may also be a transmissive liquid crystal panel or other beam modulators.

For example, as shown in FIG. 1A, in the embodiment, the illumination system 100 is configured to provide the illumination beam 70, and the illumination system 100 includes: a first laser light source 110B1, a second laser light source 110B2, a wavelength conversion module 120, a light combination element 130, a light diffusion element 140, and a light uniforming element 150. Specifically, as shown in FIGS. 1F and 1G, in the embodiment, an image frame time T represents two image times, and each image time in an image frame IM includes a first time period T1 and a second time period T2. The first laser light source 110B1 provides a first laser beam 50B1 in the first time period T1. The second laser light source 110B2 provides a second laser beam 50B2 in the second time period T2. For example, the first laser light source 110B1 and the second laser light source 110B2 are both blue laser light sources. While the first laser beam 50B1 and the second laser beam 50B2 are both blue laser beams, the main wavelength of the first laser beam 50B1 is about 445 nanometers, and the main wavelength of the second laser beam 50B2 is about 462 nanometers. In other words, in this embodiment, the first laser beam 50B1 and the second laser beam 50B2 have different main wavelengths. In addition, since the main wavelength of the first laser beam 50B1 is smaller than the main wavelength of the second laser beam 50B2, the first laser beam 50B1 with a smaller wavelength is easier to excite the wavelength conversion material of the wavelength conversion module 120 and serves as excitation light, whereas the human eyes shows better perception of the second laser beam 50B2 with a greater wavelength, so the second laser beam 50B2 serves to form the blue light portion of the illumination beam 70. Accordingly, the illumination beam 70 exhibits favorable color performance.

In the following, the process of forming the illumination beam 70 from the first laser beam 50B1 and the second laser beam 50B2 will be described in detail.

Specifically, as shown in FIG. 1A, in the embodiment, the light combination element 130 is located on the transmission path of the first laser beam 50B1 and between the first laser light source 110B1 and the wavelength conversion module 120. For example, in the embodiment, the light combination element 130 is a dichroic mirror with yellow reflection that allows blue light to pass through and reflects yellow light. Therefore, the light combination element 130 allows the first laser beam 50B1 that is blue to pass through. Accordingly, the first laser beam 50B1 of the first laser light source 110B1 may be transmitted to the wavelength conversion module 120 through the light combination element 130.

More specifically, as shown in FIGS. 1A and 1B, in the embodiment, the wavelength conversion module 120 is located on the transmission path of the first laser beam 50B1 and is adapted to rotate. For example, in the embodiment, the rotation frequency of the wavelength conversion module 120 is in a range between 60 Hz and 180 Hz. In addition, as shown in FIG. 1B, in the embodiment, the wavelength conversion module 120 includes a wavelength conversion material. The wavelength conversion material is formed in an O-ring shape, thereby forming a ring-shaped wavelength conversion region WR of the wavelength conversion module 120. Besides, the wavelength conversion module 120 has a rotary table, for example. The surface of the rotary table is coated with a reflective coating or the surface of the rotary table is reflective, and the wavelength conversion material is coated on or attached to the surface of the rotary table. Since the region where the wavelength conversion material is located is ring-shaped, the rotation of the wavelength conversion module 120 does not need to synchronize with the on/off times of the first laser light source 110B1 and the second laser light source 110B2 or the time for switching the state of the light valve module 210. Accordingly, in the first time period T1 when the first laser beam 50B1 is provided, the first laser beam 50B1 may pass through the ring-shaped wavelength conversion region WR of the wavelength conversion module 120 to form a first color light 60Y. For example, in the embodiment, the wavelength conversion material may include a phosphor that excites a yellow beam. Therefore, the first color light 60Y converted from the first laser beam 50B1 is yellow. Then, as shown in FIG. 1A, in the embodiment, the first color light 60Y may be reflected and transmitted to the light combination element 130 and then reflected to the light uniforming element 150 through the light combination element 130.

Meanwhile, as shown in FIG. 1A, in the embodiment, the second laser beam 50B2 provided by the second laser light source 110B2 may be transmitted to the light diffusion element 140 and the light combination element 130 through a reflection element RE. More specifically, as shown in FIG. 1A, in the embodiment, the light diffusion element 140 is located on the transmission path of the second laser beam 50B2 and located between the second laser light source 110B2 and the light uniforming element 150. Specifically, in the embodiment, the light diffusion element 140 may be located between the second laser light source 110B2 and the light combination element 130 or located between the light combination element 130 and the light uniforming element 150, as long as the second laser beam 50B2 passes through the light diffusion element 140 before being transmitted to the light uniforming element 150. In addition, in the embodiment, the light diffusion element 140 is adapted to rotate, and is adapted to reduce or eliminate the laser speckle phenomenon. For example as shown in FIG. 1C, in the embodiment, the light diffusion element 140 may be circular and is adapted to rotate about an axis center. However, the invention is not limited thereto. Accordingly, during the second time period T2 in which the second laser beam 50B2 is provided, the second laser beam 50B2 may pass through the light diffusion element 140 and the light combination element 130 to form a second color light 70B that is blue, and the second color light 70B may be further transmitted to the light uniforming element 150.

More specifically, as shown in FIG. 1F, in the embodiment, the light uniforming element 150 is located on the transmission paths of the first color light 60Y and the second color light 70B of the illumination beam 70. In the embodiment, the light uniforming element 150 includes an integration rod. However, the invention is not limited thereto. More specifically, as shown in FIG. 1A, the first color light 60Y and the second color light 70B are generated according to a time sequence. When the first color light 60Y and the second color light 70B of the illumination beam 70 are transmitted to the light uniforming element 150, the light uniforming element 150 may uniform the illumination beam 70 to transmit the illumination beam 70 to the light valve module 210. The illumination beam 70 includes the first color light 60Y and the second color light 70B transmitted according to a time sequence.

In other words, as shown in FIGS. 1A, 1D, and 1E, in the embodiment, when the first color light 60Y and the second color light 70B exit the illumination system 100 according to a time sequence, the first color light 60Y and the second color light 70B may be respectively transmitted to the corresponding light valves in the light valve module 210.

More specifically, as shown in FIGS. 1D and 1E, the light valve module 210 further includes a light splitting element DM. The light splitting element DM is located on the transmission paths of the first color light 60Y and the second color light 70B. As shown in FIG. 1D, in the first time period T1, after being transmitted to the light splitting element DM, the first color light 60Y passes through the light splitting element DM and is split into a third color light 71 and a fourth color light 72. Accordingly, as shown in FIG. 1D, the third color light 71 is transmitted to the first light valve 211, and the fourth color light 72 is transmitted to the second light valve 212. In the embodiment, the light splitting element DM is, for example, a dichroic mirror with green reflection that allows blue light and red light to pass through and reflects green light. Therefore, in the embodiment, the third color light 71 is green light, for example, and the fourth color light 72 is red light, for example. However, the invention is not limited thereto. In an embodiment not shown herein, by modifying the optical effect of the light splitting element, such as making the light splitting element a dichroic mirror with red reflection, the light splitting element may allow blue light and green light to pass through and reflect red light. However, the invention is not limited thereto.

Meanwhile, in the second time period T2, the second color light 70B is transmitted to one of the first light valve 211 and the second light valve 212. As shown in FIG. 1E, in the embodiment, the second color light 70B may be transmitted to the second light valve 212 after passing through the light splitting element DM. In this way, the first light valve 211 and the second light valve 212 may be configured to convert the corresponding second color light 70B, third color light 71, and fourth color light 72 into a plurality of image beams 80B, 80G, and 80R according to a time sequence. In addition, the projection lens 220 is located on the transmission paths of the image beams 80B, 80G, and 80R, and is adapted to project the image beams 80B, 80G, and 80R onto a screen (not shown) to form the image frame IM. In addition, since the first light valve 211 and the second light valve 212 are able to convert the corresponding second color light 70B, third color light 71, and fourth color light 72 into the image beams 80B, 80G, and 80R of different colors, the image frame IM projected through the image beams 80B, 80G, and 80R from the first light valve 211 and the second light valve 212 may be a colored image.

More specifically, as shown in FIGS. 1F and 1G, the color refresh rate of the image frame IM projected by the projection apparatus 200 may be determined according to the number of times of switching the ON or OFF states of the first laser light source 110B1 and the second light source 110B2 (the dark blocks in the figures indicate OFF). A greater number of times that the first laser light source 110B1 and the second laser light source 110B2 are alternately turned on indicates a higher color refresh rate of the image frame IM projected by the projection apparatus 200 (as shown in FIG. 1G). In other words, the color refresh rate of the image frame IM projected by the projection apparatus 200 may be considered as the number of times that a plurality of first time periods T1 and a plurality of second time periods T2 alternate with each other. The number of times that the first time periods T1 and the second time periods T2 alternate with each other correspond to the number of times that the first laser light source 110B1 and the second laser light source 110B2 are alternately turned on and off.

In general, the time duration of visual persistence of human eyes is $\frac{1}{16}$ seconds. Therefore, the color refresh rate and the screen refresh rate of the projection apparatus 200 need to be greater than 16 Hz. However, in the embodiment, since the first laser light source 110B1 and the second laser light source 110B2 are able to be turned on and off immediately, as shown in FIGS. 1F and 1G, the range of the color refresh rate of the projection apparatus 200 according to the embodiment is expanded to between 60 Hz and 6000 Hz. Besides, since the wavelength conversion module 120 is arranged as a ring-shaped wavelength conversion region, the image discoloring phenomenon resulting from a spoke does not occur while the color refresh rate is increased. Therefore, the projection apparatus 200 does not need to turn off the first light valve 211 and the second light valve 212 during operation of the first light valve 211 and the second light valve 212. As a result, the brightness of the displayed image can be maintained.

Accordingly, with the first laser light source 110B1 and the second laser light source 110B2, the projection apparatus 200 is able to form the color lights as desired in different time periods while avoiding the discoloring phenomenon of an image resulting from the spoke, thereby maintaining the brightness of the frame. In addition, with the projection apparatus 200 and the control method for the projection apparatus 200 according to the embodiments of the invention, the color refresh rate of the projection apparatus 200 can be increased by simply and freely switching the ON and OFF states of the first laser light source 110B1 and the second laser light source 110B2. Accordingly, the color break issue can be eliminated, and the viewing experience can be smoother.

Meanwhile, while the method for controlling the movement of the light diffusion element 140 in the embodiment of FIGs. 1A to 1G are described as controlling the light diffusion element 140 to rotate about an axis center, the invention is not limited thereto. In other embodiments, the method for controlling the movement of the light diffusion element 140 may be correspondingly adjusted according to the type of the light diffusion element 140. With reference to the disclosure of the invention, people skilled in the art may suitably modifying the method for controlling the movement of the light diffusion element to attain an effect similar to that of the light diffusion element 140, and such modification shall still remain under the scope of the invention. Some embodiments will be further described in the following.

Figure 2:
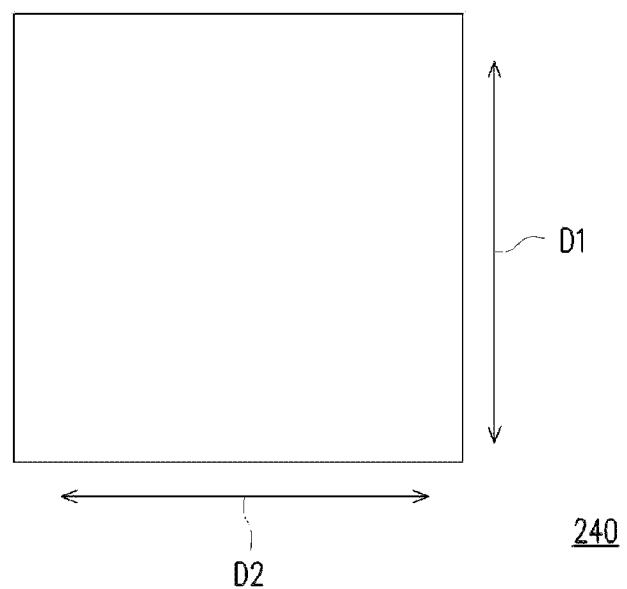
FIG. 2 is a schematic view illustrating another light diffusion element of FIG. 1A.

FIG. 2 is a schematic view illustrating another light diffusion element of FIG. 1A. A light diffusion element 240 of FIG. 2 is similar to the light diffusion element 140 of FIG.

1C, and the difference therebetween will be set forth in the following. In the embodiment, the shape of the light diffusion element 240 is not limited to being circular. The shape of the light diffusion element 240 may also be a rectangular shape or other polygonal shapes. The light diffusion element 240 is suitable for moving in at least one direction. For example, as shown in FIG. 2, in the embodiment, the light diffusion element 240 may move along a first direction D1 or a second direction D2. Therefore, when the light diffusion element 240 is applied to the illumination system 100 and the projection apparatus 200, the intensity distribution of the second laser beam 50B2 may also be diffused and changed through the movement of the light diffusion element 240, so as to reduce or eliminate laser speckle, thereby attaining the effects and advantages of the illumination system 100 and the projection apparatus 200 described above. Therefore, details in this regard will not be repeated in the following.

Figure 3A:
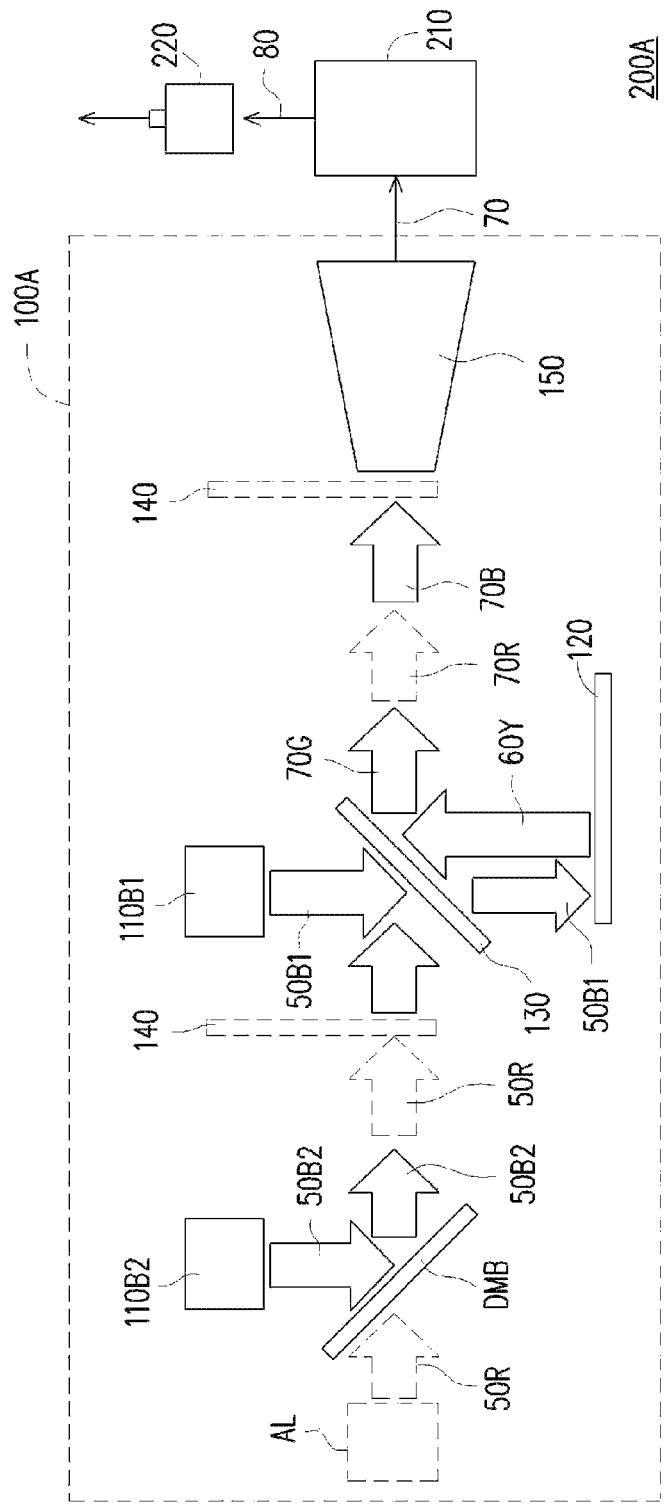
FIG. 3A is a schematic view illustrating a framework of another projection apparatus according to an embodiment of the invention.
Figure 3B:
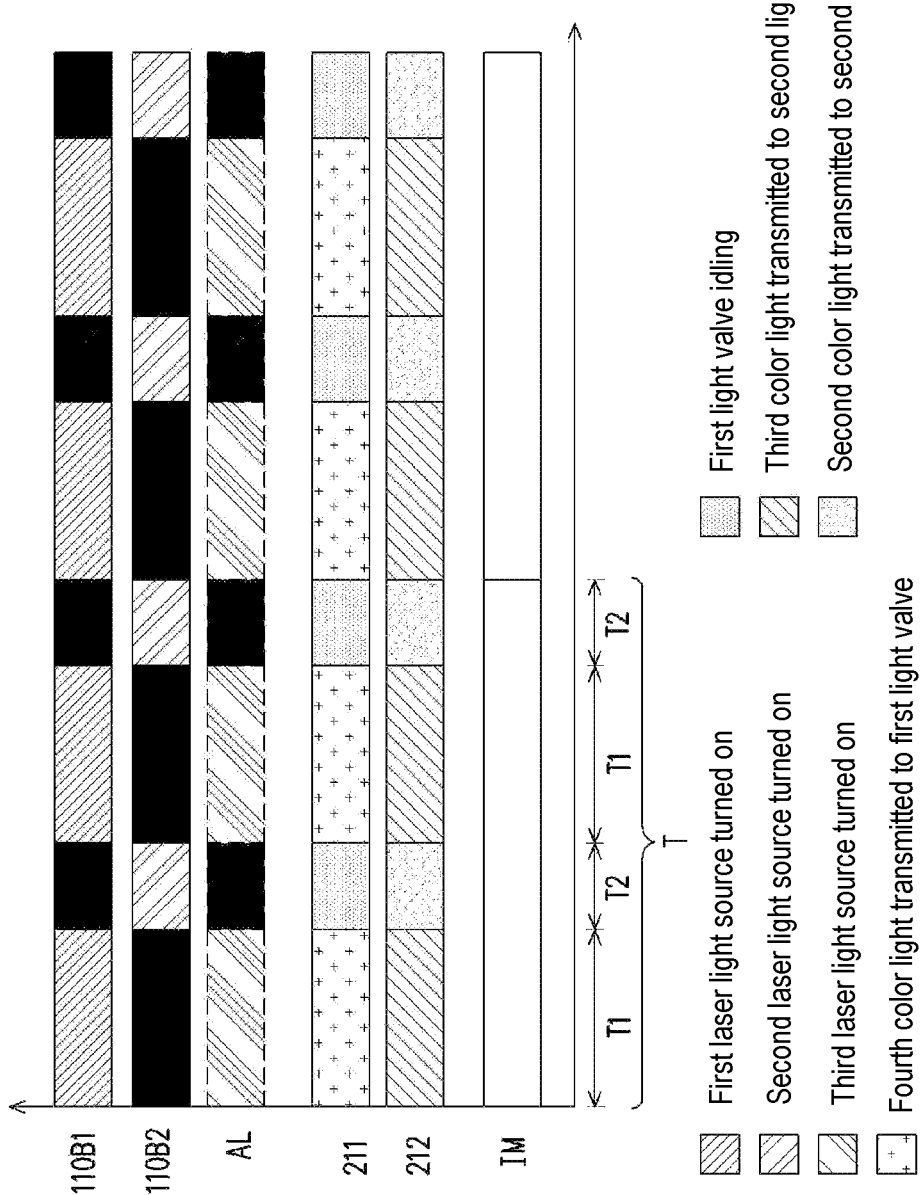
FIG. 3B is a schematic view illustrating a time sequence of a first laser light source, a second laser light source, a third laser light source, a first light valve, and a second light valve of FIG. 3A in different time periods.
Figure 3C:
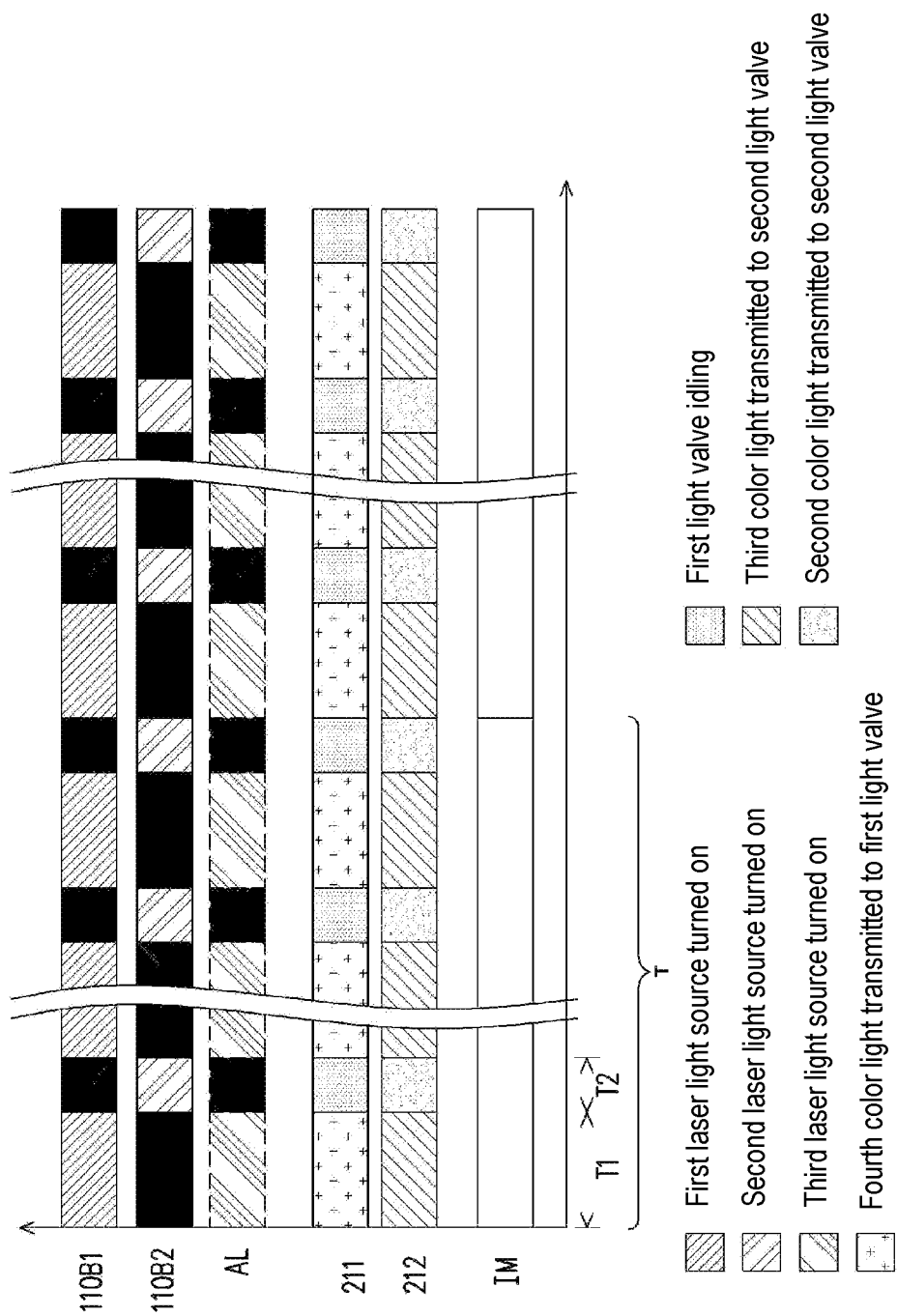
FIG. 3C is a schematic view illustrating another time sequence of a first laser light source, a second laser light source, a third laser light source, a first light valve, and a second light valve of FIG. 3A in different time periods.

FIG. 3A is a schematic view illustrating a framework of another projection apparatus according to an embodiment of the invention. FIG. 3B is a schematic view illustrating a time sequence of a first laser light source, a second laser light source, a third laser light source, a first light valve, and a second light valve of FIG. 3A in different time periods. FIG. 3C is a schematic view illustrating another time sequence of a first laser light source, a second laser light source, a third laser light source, a first light valve, and a second light valve of FIG. 3A in different time periods. A projection apparatus 200A and an illumination system 100A of FIG. 3A are similar to the projection apparatus 200 and the illumination system 100 of FIG. 1A, and the difference therebetween will be described in the following. Referring to FIGS. 3A to 3C, in the embodiment, the illumination system 100A of the projection apparatus 200A further includes a third laser light source AL, and the third laser light source AL is configured to provide a third laser beam 50R during the first time period T1. The waveband of the third laser beam 50R is at least partially overlapped with the waveband of the first color light 60Y. For example, in the embodiment, the third laser light source AL is a red laser light source, and the third laser beam 50R is red light, for example. The main wavelength of the third laser beam 50R is 638 nanometers, for example.

Specifically, in the embodiment, the light combination element 130 is a dichroic mirror with green and orange reflection (DMGO) that allows blue light and red light to pass through and reflects green light and orange light. In addition, the illumination system 100A further includes a dichroic mirror DMB. The dichroic mirror DMB is located on the transmission paths of the second laser beam 50B2 and the third laser beam 50R. In addition, in the embodiment, the dichroic mirror DMB is a dichroic mirror with blue reflection that allows red light to pass through and reflects blue light. Accordingly, as shown in FIG. 3A, the second laser beam 50B2 of the second laser light source 110B2 may still be reflected by the dichroic mirror DMB and transmitted to the light combination element 130. Meanwhile, as shown in FIG. 3A, the light diffusion element 140 is also located on the transmission path of the third laser beam 50R. Accordingly, during the first time period, the third laser beam 50R of the third laser light source AL may also pass through the dichroic mirror DMB and the light diffusion element 140 and be transmitted to the light combination element 130 to form a third color light 70R. More specifically, as shown in FIG. 3A, in the embodiment, the light diffusion element 140 is located on the transmission path of the third laser beam 50R and located between the third laser light source AL and the light uniforming element 150. For example, in the embodiment, the light diffusion element 140 may be located between the third laser light source AL and the light combination element 130 or located between the light combination element 130 and the light uniforming element 150.

In addition, as shown in FIG. 3A, in the embodiment, a portion of the first color light 60Y (yellow light) may be reflected by the light combination element 130 to form a fourth color light 70G, and the fourth color light 70G is green light, for example. Accordingly, the second color light 70B, the third color light 70R, and the fourth color light 70G may form the illumination beam 70 according to a time sequence after passing through the light uniforming element 150 and then be respectively transmitted to the corresponding light valves in the light valve module 210, so as to form a colored image. The illumination beam 70 includes the second color light 70B, the third color light 70R, and the fourth color light 70G transmitted according to a time sequence.

Accordingly, with the third laser light source AL, the illumination system 100A is able to freely adjust the proportion of red light in the illumination beam 70, thereby enhancing red color performance in the projected image. In addition, in the embodiment, since the illumination system 100A, like the illumination 100 of FIG. 1A, has the first laser light source 110B1 and the second laser light source 110B2, the projection apparatus 200A is able to attain the effects and advantages similar to the projection apparatus 200. Therefore, details in this regard will not be repeated in the following.

As shown in FIGS. 3B and 3C, the color refresh rate of the image frame IM projected by the projection apparatus 200A of FIG. 3A may be determined according to the number of times of switching the ON or OFF states of the first laser light source 110B1, the second laser light source 110B2, and the third laser light source AL, and the first laser light source 110B1 and the third laser light source AL are turned on or off at the same time. In addition, a greater number of alternately turning on the first laser light source 110B1, the third laser light source AL, and the second laser light source 110B2 indicates a higher color refresh rate (as shown in FIG. 3C) of the image frame IM projected by the projection apparatus 200A. In other words, the color refresh rate of the image frame IM projected by the projection apparatus 200A may be considered as the number of times that the first time periods T1 and the second time periods T2 alternate with each other.

In view of the foregoing, the embodiments of the invention include at least one of the following advantages or effects. According to the embodiments of the invention, with the first laser light source and the second laser light source, under the condition that the wavelength conversion module is disposed in the ring-shaped wavelength conversion region, the color lights as desired can be formed in different time periods while avoiding the discoloring phenomenon of an image due to the spoke. Besides, the brightness of the displayed frame can be maintained. In addition, with the projection apparatus and the control method for the projection apparatus according to the embodiments of the invention, the color refresh rate of the projection apparatus can be increased by simply and freely switching the ON and OFF states of the first laser light source and the second laser light source. Accordingly, the color break issue can be eliminated, and the viewing experience can be smoother.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising an illumination system, a first light valve, and a second light valve, the illumination system being configured to provide an illumination beam, and the illumination system comprising a first laser light source and a second laser light source, wherein:
the first laser light source provides a first laser beam in a plurality of first time periods;
the second laser light source provides a second laser beam in a plurality of second time periods, wherein the first laser beam and the second laser beam have different main wavelengths, a color refresh rate of the projection apparatus is a number of times of alternating the first time periods and the second time periods with each other, and a range of the color refresh rate is between 60 Hz and 6000 Hz; and
the first laser beam and the second laser beam respectively form a first color light and a second color light, the first light valve and the second light valve are located on a transmission path of the first color light, and one of the first light valve and the second light valve is located on a transmission path of the second color light,
wherein a duration of each of the first time periods during the first color light respectively incident to the first light valve and the second light valve is longer than a duration of each of the second time periods during the second color light incident to one of the first light valve and the second light valve.

2. The projection apparatus as claimed in claim 1, wherein the illumination system further comprises a wavelength conversion module located on a transmission path of the first laser beam and adapted to rotate, wherein a range of a rotation frequency of the wavelength conversion module is between 60 Hz and 180 Hz.

3. The projection apparatus as claimed in claim 2, wherein the wavelength conversion module comprises a ring-shaped wavelength conversion region, and in the first time period, the first laser beam passes through the ring-shaped wavelength conversion region to form the first color light.

4. The projection apparatus as claimed in claim 1, wherein the illumination system further comprises a light uniforming element located on the transmission paths of the first color light and the second color light.

5. The projection apparatus as claimed in claim 4, wherein the illumination system further comprises a light diffusion element adapted to move and located on a transmission path of the second laser beam and between the second laser light source and the light uniforming element, and in the second time period, the second laser beam passes through the light diffusion element to form the second color light.

6. The projection apparatus as claimed in claim 5, wherein the illumination system further comprises a third laser light source providing a third laser beam during the first time period, the light diffusion element is located on a transmission path of the third laser beam, and in the first period, the third laser beam passes through the light diffusion element to form a third color light.

7. The projection apparatus as claimed in claim 5, wherein the illumination system further comprises a light combination element located on a transmission path of the first laser beam and between the first laser light source and the wavelength conversion module.

8. The projection apparatus as claimed in claim 7, wherein the light diffusion element is located between the second laser light source and the light combination element.

9. The projection apparatus as claimed in claim 7, wherein the light diffusion element is located between the light combination element and the light uniforming element.

10. The projection apparatus as claimed in claim 1, further comprising:
a light splitting element, located on the transmission paths of the first color light and the second color light, wherein in the first time period, the first color light forms a third color light and a fourth color light respectively after passing through the light splitting element, the third color light is transmitted to the first light valve, the fourth color light is transmitted to the second light valve, and in the second time period, the second color light is transmitted to one of the first light valve and the second light valve.

11. The control method as claimed in claim 1,
wherein the first laser beam and the second laser beam are blue laser beams having different main wavelengths, and the main wavelengths of the first laser beam and the second laser beam are less than 500 nanometers.

12. A control method for a projection apparatus, adapted to control the projection apparatus comprising an illumination system, a first light valve, and a second light valve, the illumination system being configured to provide an illumination beam, the illumination system comprising a first laser light source and a second laser light source, and the control method comprising:
controlling the first laser light source to provide a first laser beam during a plurality of first time periods, wherein the first laser beam forms a first color light, and the first light valve and the second light valve are located on a transmission path of the first color light; and controlling the second laser light source to provide a second laser beam during a plurality of second time periods, wherein the first laser beam and the second laser beam have different main wavelengths, the second laser beam forms a second color light, one of the first light valve and the second light valve is located on a transmission path of the second color light, and a color refresh rate of the projection apparatus is a number of times of alternating the first time periods and the second time periods with each other, and a range of the color refresh rate is between 60 Hz and 6000 Hz, wherein a duration of each of the first time periods during the first color light respectively incident to the first light valve and the second light valve is longer than a duration of each of the second time periods during the second color light incident to one of the first light valve and the second light valve.

13. The control method as claimed in claim 12, further comprising rotating a wavelength conversion module of the illumination system, wherein a range of a rotation frequency of the wavelength conversion module is between 60 Hz and 180 Hz, and the wavelength conversion module is located on a transmission path of the first laser beam.

14. The control method as claimed in claim 13, further comprising forming the first color light through the first laser beam passing through a ring-shaped wavelength conversion region during the first time period, wherein wavelength conversion module comprises the ring-shaped wavelength conversion region.

15. The control method as claimed in claim 12, wherein a light uniforming element is disposed in the illumination system, and the light uniforming element is located on the transmission paths of the first color light and the second color light.

16. The control method as claimed in claim 15, further comprising moving a light diffusion element of the illumination system, wherein the light diffusion element is located on a transmission path of the second laser beam and between the second laser light source and the light uniforming element, and in the second time period, the second laser beam passes through the light diffusion element to form the second color light.

17. The control method as claimed in claim 16, wherein the illumination system further comprises a third laser light source, and the control method further comprises:

controlling the third laser light source to provide a third laser beam during the first time period, wherein the light diffusion element is located on a transmission path of the third laser beam, and in the first period, the third laser beam passes through the light diffusion element to form a third color light.

18. The control method as claimed in claim 16, wherein a light combination element of the illumination system is located on a transmission path of the first laser beam and between the first laser light source and the wavelength conversion module.

19. The control method as claimed in claim 18, wherein the light diffusion element is located between the second laser light source and the light combination element.

20. The control method as claimed in claim 18, wherein the light diffusion element is located between the light combination element and the light uniforming element.

21. The control method as claimed in claim 12, wherein a light splitting element of the projection apparatus is disposed on the transmission paths of the first color light and the second color light, wherein in the first time period, the first color light forms a third color light and a fourth color light respectively after passing through the light splitting element, the third color light is transmitted to the first light valve, the fourth color light is transmitted to the second light valve, and in the second time period, the second color light is transmitted to one of the first light valve and the second light valve.

* * * * *